United States Patent [19]
Gotz

[11] 3,807,787
[45] Apr. 30, 1974

[54] COMMERCIAL VEHICLE WITH APPROXIMATELY BOX-SHAPED BODY STRUCTURE

[75] Inventor: Hans Gotz, Sindelfingen, Germany

[73] Assignee: Daimler-Benz Aktiengesellschaft, Stuttgart-Unterturkheim, Germany

[22] Filed: Feb. 29, 1972

[21] Appl. No.: 230,232

[30] Foreign Application Priority Data
Mar. 2, 1971   Germany............................ 2109746

[52] U.S. Cl. ...................... 296/1 S, 98/2.14, 296/91
[51] Int. Cl............................................... B60j 1/20
[58] Field of Search ..................... 296/1 S, 28 A, 91; 105/28 A; 98/2.14, 2.15, 2; 62/239

[56] References Cited
UNITED STATES PATENTS

| | | | |
|---|---|---|---|
| 2,242,494 | 5/1941 | Wolf................................. | 296/1 S X |
| 1,518,319 | 12/1924 | Freeman et al...................... | 98/2.14 |
| 1,584,275 | 5/1926 | Chalkley............................. | 296/1 S X |
| 1,621,356 | 3/1927 | Dickey............................... | 105/2 A X |
| 3,097,882 | 7/1963 | Andrews............................. | 296/91 |
| R26,538 | 3/1969 | Bott................................... | 296/91 X |
| 3,519,178 | 7/1970 | Helm et al. ........................ | 296/91 X |

FOREIGN PATENTS OR APPLICATIONS
1,066,371   4/1967   Great Britain...................... 296/1 S Primary Examiner—David Schonberg
Assistant Examiner—Leslie J. Paperner
Attorney, Agent, or Firm—Craig and Antonelli

[57] ABSTRACT

A commercial-type motor vehicle such as a bus with an approximately box-shaped body, in which the rear portion of the body is protected against excessive soiling during the drive of the vehicle by deflecting the air flowing over the roof in the direction toward the rear section of the vehicle; already present roof super structures such as a luggage rack or a cooling installation are thereby utilized to provide an air guide duct between the outer roof panel and this roof superstructure.

9 Claims, 5 Drawing Figures

PATENTED APR 30 1974  3,807,787
FIG.1
FIG.2
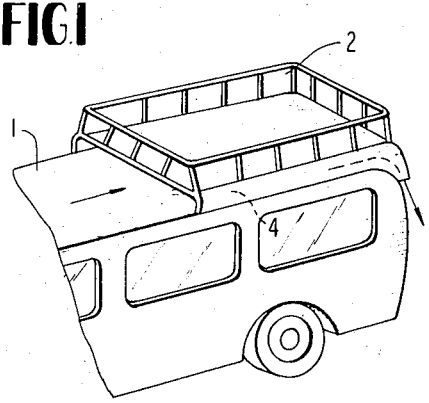
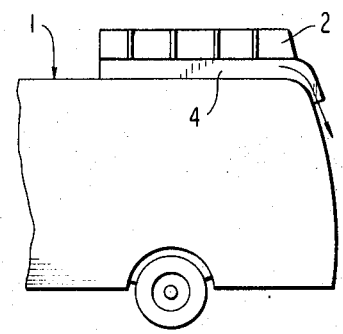
FIG.3
FIG.4
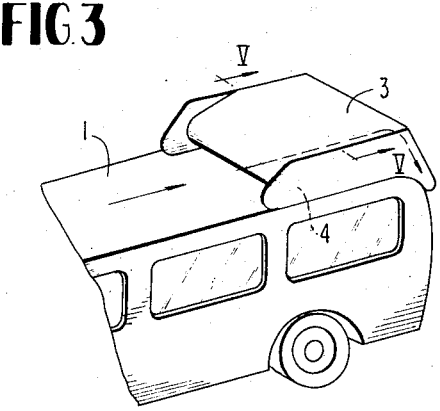
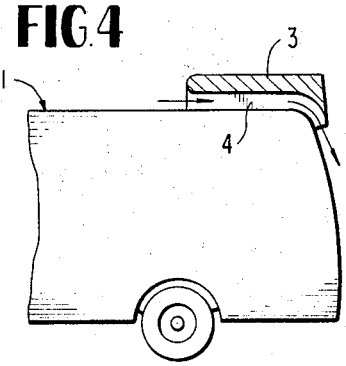
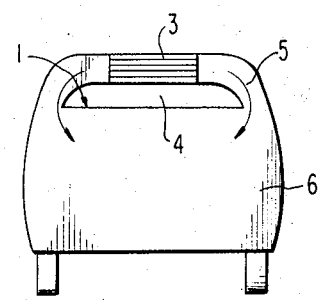
FIG.5

COMMERCIAL VEHICLE WITH APPROXIMATELY BOX-SHAPED BODY STRUCTURE

The present invention relates to a commercial-type motor vehicle with an approximately box-shaped body in which the rear section of the body is protected against strong soiling during the driving operation in that the air sweeping over the roof is deflected onto the rear end.

Such an air guidance, as is described for example, in the German Gebrauchsmuster 1,995,373, considerably contributes to keeping the rear portion of vehicles with approximately box-shaped body structures free from soiling and firt.

However, it happens frequently that the air flow is disturbed within the area of the roof of such vehicles by additional structures such as, for example, luggage platforms or cooling installations so that an air guide means arranged at the vehicle rear end does not produce the desired success.

The present invention is concerned with the task to provide an effective remedy for these shortcomings.

According to he present invention, it is therefore proposed for commercial types of motor vehicles of the type described above to utilize already present roof structures or superstructures such as luggage racks or cooling installations for the air guide system.

According to a particularly advantageous embodiment of the present invention, an air guide channel or duct is thereby formed between the outer roof panel and the roof superstructure.

Accordingly, it is an object of the present invention to provide a commercial-type motor vehicle with approximately box-shaped body which avoids by simple means the aforementioned shortcomings and drawbacks encountered in the prior art.

Another object of the present invention resides in a commercial-type motor vehicle in which a soiling protection by an air flow over the rear end of the vehicle is not impaired by any possibly existing roof superstructures.

A further object of the present invention resides in a motor vehicle roof provided with a superstructure such as a loading platform or cooling installation which effectively utilizes the superstructure to form an air guide channel assuring the appropriate deflection of the air to prevent soiling of the vehicle rear end.

These and other objects, features, and advantages of the present invention will become more apparent from the following description when taken in connection with the accompanying drawing which shows, for purposes of illustration only, several embodiments in accordance with the present invention, and wherein:

FIG. 1 is a partial perspective view from above on the left portion of a bus with a luggage rack mounted thereon in accordance with the present invention;

FIG. 2 is a somewhat schematic cross-sectional view in a longitudinal plane through the bus according to FIG. 1;

FIG. 3 is a partial perspective view from above on the left rear portion of a bus roof with an installed cooling installation in accordance with the present invention;

FIG. 4 is a cross-sectional view in a longitudinal plane through the bus according to FIG. 3; and FIG. 5 is a cross-sectional view taken long line V—V of FIG. 3.

Referring now to the drawing wherein like reference numerals are used throughout the various views to designte like parts, in the bus illustrated in FIGS. 1 to 5, an air guide channel or duct 4 is formed in each case between the outer cover panel 1 of the roof and the luggage platform or rack 2 or the cooling installation 3; the air guide channel or duct 4 is drawn at its rear end about the rear upper edge of the body and thereby guides the air flowing therethrough over the rear portion of the body. Tests have demonstrated that the air guide channel 4 must have an internal height of about 100 mm.

FIG. 5 illustrates an embodiment in which with a cooling installation 3, the necessary air circulation between cooling installation 3 and the interior space 6 of the vehicle can be established through outer air shafts 5 which form the lateral boundary of the air guide channel 4.

While I have shown and described only a few embodiments in accordance with the present invention, it is understood that the same is not limited thereto but is susceptible of numerous changes and modifications as known to those skilled in the art, and I therefore do not wish to be limited to the details shown and described herein but intended to cover all such changes and modifications as are encompassed by the scope of the appended claims.

What I claim is:

1. A commercial-type motor vehicle with approximately box-shaped body means, in which the rear portion of the body means is protected against strong soiling during the drive of the vehicle in that the air flowing over the vehicle roof is deflected in the direction toward the rear end of the vehicle, characterized in that already present roof superstructure means comprising a cooling installation superstructure serves for the air guidance wherein the air flowing over the vehicle roof is separated from the flow of any fluid within said cooling installation by said cooling installation superstructure.

2. A commercial-type motor vehicle with roof outer body panel means according to claim 1, characterized in that an air guide channel is formed in effect between the outer body panel means of the roof and the superstructure means.

3. A commercial-type motor vehicle with approximately box-shaped body means, in which the rear portion of the body means is protected against strong soiling during the drive of the vehicle in that the air flowing over the vehicle roof is deflected in the direction toward the rear end of the vehicle, characterized in that already present roof superstructure means serves for the air guidance, said roof superstructure means being a cooling installation, and wherein the air circulation between the cooling installation and an inertior space of the vehicle is established by way of outer air shafts constituting simultaneously the lateral boundary of the air guide channel.

4. A commercial-type motor vehicle with roof outer body panel means according to claim 3, characterized in that an air guide channel is formed in effect between the outer body panel means of the roof and the superstructure means.

5. A motor vehicle comprising:
   a vehicle body having a vehicle roof portion and a vehicle rear portion, a cooling installation superstructure supported on said vehicle roof portion, said cooling installation superstructure enclosing a cooling installation which supplies cooling fluid to an interior space of said vehicle, and soiling prevention means including air guidance means for guiding air flowing over the vehicle roof portion during the drive of the vehicle in a direction toward the rear end of the vehicle, wherein said air guidance means is formed by said roof portion and said cooling installation superstructure, and wherein the flow of air through said guidance means is separated from the flow of any fluid within said cooling installation by said cooling installation superstructure.

6. A motor vehicle according to claim 5, wherein said motor vehicle is a commercial-type motor vehicle with approximately box-shaped body means in the area of said roof portion and rear portion.

7. A motor vehicle according to claim 5, wherein said cooling installation includes means for supplying air into said interior space of the vehicle.

8. A motor vehicle according to claim 6, wherein said cooling installation superstructure includes an upper portion spaced vertically from the top of said roof portion and two lateral portions at respective opposite lateral sides of said roof portion for connecting said upper portion to the roof portion, and wherein said air guidance means is formed between said upper portion and said roof portion intermediate said lateral portions.

9. A motor vehicle according to claim 8, wherein said lateral portions simultaneously serve as circulating means for the air from said cooling installation to said interior space and as lateral boundarys for said air guidance means.

* * * * *